(12) United States Patent
Hawkins et al.

(10) Patent No.: US 12,348,041 B2
(45) Date of Patent: Jul. 1, 2025

(54) WIND TURBINE AND METHOD

(71) Applicant: SIEMENS GAMESA RENEWABLE ENERGY A/S, Brande (DK)

(72) Inventors: Samuel Hawkins, Vejle (DK); Jesper Elliot Petersen, Oelgod (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/279,018

(22) PCT Filed: Dec. 29, 2021

(86) PCT No.: PCT/EP2021/087754
§ 371 (c)(1),
(2) Date: Aug. 25, 2023

(87) PCT Pub. No.: WO2022/184312
PCT Pub. Date: Sep. 9, 2022

(65) Prior Publication Data
US 2024/0297503 A1    Sep. 5, 2024

(30) Foreign Application Priority Data
Mar. 1, 2021 (EP) .................................. 21159942

(51) Int. Cl.
*H02J 3/38* (2006.01)
*F03D 9/25* (2016.01)
(Continued)

(52) U.S. Cl.
CPC .................. *H02J 3/38* (2013.01); *F03D 9/25* (2016.05); *H01M 8/04201* (2013.01);
(Continued)

(58) Field of Classification Search
CPC . H02J 3/38; H02J 9/06; H02J 2300/28; F03D 9/25; F03D 80/003; F03D 9/19;
(Continued)

(56) References Cited

U.S. PATENT DOCUMENTS 7,471,010 B1    12/2008  Fingersh
11,929,638 B2 *  3/2024  Sogaard et al. ......... H02J 1/106
(Continued)

FOREIGN PATENT DOCUMENTS

WO   WO-2012103894 A2 *  8/2012  ............... F03D 1/02
WO       2020095012 A1      5/2020
WO       2020228918 A1     11/2020

OTHER PUBLICATIONS

PCT International Search Report and Written Opinion of International Searching Authority mailed Mar. 25, 2022 corresponding to PCT International Application No. PCT/EP2021/087754 filed Dec. 29, 2021.

*Primary Examiner* — Charles Reid, Jr.
(74) *Attorney, Agent, or Firm* — Schmeiser, Olsen & Watts LLP (57) ABSTRACT

A wind turbine includes a generator for converting wind energy into electrical energy, a hydrogen production system for producing hydrogen by means of the electrical energy, a first auxiliary group of electrical consumers, a second auxiliary group of electrical consumers, and an auxiliary power network for powering the first auxiliary group and the second auxiliary group, wherein only the first auxiliary group is electrically disconnected from the auxiliary power network by means of one or a plurality of switch disconnectors to reduce the energy consumption of the auxiliary power network. Due to the one or the plurality of switch disconnectors, it is possible to disconnect the first auxiliary group from power. This helps to save energy in the case that (Continued)

the first auxiliary group is not needed for the operation of the wind turbine.

14 Claims, 8 Drawing Sheets

(51) Int. Cl.
    *H01M 8/04082*     (2016.01)
    *H01M 8/0656*     (2016.01)
    *H01M 16/00*     (2006.01)
    *H02J 9/06*     (2006.01)

(52) U.S. Cl.
    CPC ....... H01M 8/0656 (2013.01); H01M 16/006 (2013.01); H02J 9/06 (2013.01); *F05B 2220/61* (2013.01); *H01M 2220/10* (2013.01); *H01M 2250/10* (2013.01); *H01M 2250/402* (2013.01); *H02J 2300/28* (2020.01)

(58) Field of Classification Search
    CPC ........... H01M 8/04201; H01M 8/0656; H01M 16/006; H01M 2220/10; H01M 2250/10; H01M 2250/402; F05B 2220/61; F05B 2240/95; Y02E 60/36
    USPC .............................................. 290/1 R, 44, 55
See application file for complete search history.

(56) References Cited

U.S. PATENT DOCUMENTS

| | | |
|---|---|---|
| 2003/0168864 A1 | 9/2003 | Heronemus et al. |
| 2007/0216165 A1 | 9/2007 | Oohara et al. |
| 2008/0121525 A1* | 5/2008 | Doland .................... C25B 1/04 322/29 |
| 2008/0127646 A1* | 6/2008 | Doland ................... F03D 9/007 60/495 |
| 2009/0289227 A1* | 11/2009 | Rising ....................... C25B 1/00 422/600 |
| 2013/0093194 A1* | 4/2013 | Barbachano .......... H02J 15/008 290/55 |
| 2020/0166017 A1 | 5/2020 | Hansen et al. |

* cited by examiner

WIND TURBINE AND METHOD

CROSS-REFERENCE TO RELATED APPLICATIONS

This application claims priority to PCT Application No. PCT/EP2021/087754, having a filing date of Dec. 29, 2021, which claims priority to EP Application No. 21159942.8, having a filing date of Mar. 1, 2021, the entire contents both of which are hereby incorporated by reference.

FIELD OF TECHNOLOGY

The following relates to a wind turbine and to a method for operating the wind turbine.

BACKGROUND

Wind turbines can be used for producing hydrogen. The typical solution involves adding hydrogen electrolysis equipment to an existing wind turbine design. During operation some of the power produced by the wind turbine is utilized to produce hydrogen while most of the power is distributed to the grid. Such wind turbines can be described as having a hybrid purpose.

The drawback of this hybrid solution is that the wind turbine is dedicated to neither the production of electricity for general consumption nor the production of hydrogen. Extra cost is therefore included to support both purposes. Feeding power to the grid, for example, requires that the wind turbine meet strict grid codes and maintain a frequency aligned with the grid. The power produced by a wind turbine must also be transformed to high voltages (33 to 66 kV) in order to facilitate low loss transmission within a wind farm. This requires a transformer rated to a similar power rating as the wind turbine located at the turbine.

Further transmission involves the use of an electrical substation that transforms the voltage even higher (132 to 200 kV) for longer distance distribution. Equipment for controlling the flow of power and for safely disconnecting the wind turbines and portions of the wind farm are also necessary and must be capable of supporting the high power and voltage levels. These systems and components have high costs, making up a significant portion of the cost of a wind farm.

Hydrogen can be produced at a lower cost by a wind turbine wholly dedicated to the task of producing hydrogen. US 2003/0168864 A1 describes an offshore wind turbine that is dedicated for hydrogen producing without a grid connection.

US 2020/0166017 A1 describes the operation of a wind turbine using a power storage unit, such as a rechargeable battery, to power a group of power consuming units during grid loss. The wind turbine comprises a number of power consuming units being grouped into at least a first group and a second group, a first electrical converter for connecting the generator to the electrical grid, and a second electrical converter for connecting the electrical generator to the power storage unit. Upon detecting an occurrence of the grid loss, the generator is operated to ensure sufficient power of the power storage unit to operate the first group of power consuming units.

US 2007/0216165 A1 describes a wind turbine-driven hydrogen production system controlling a power converter system such that the wind turbine stays in its operable range for a longer time and thus the hydrogen production system produces hydrogen for a longer time. The wind turbine-driven hydrogen production system varies an amount of electrical current supplied to an electrolytic hydrogen production system according to the rotational speed of the wind turbine to reduce variations in the rotational speed. Furthermore, the pitch angle of the wind turbine varies according to the speed. Thus, variations in the speed of the wind turbine can be reduced. A permanent-magnet generator is used as the electricity generator of the wind turbine to obtain a power supply at start-up.

SUMMARY

An aspect relates to provide an improved wind turbine.

Accordingly, a wind turbine is provided. The wind turbine comprises a generator for converting wind energy into electrical energy, a hydrogen production system for producing hydrogen by means of the electrical energy, a first auxiliary group of electrical consumers, a second auxiliary group of electrical consumers, an auxiliary power network for powering the first auxiliary group and the second auxiliary group, and a power conditioning device for providing power to the hydrogen production system as well as to the auxiliary power network, wherein only the first auxiliary group can be electrically disconnected from the auxiliary power network by means of one or a plurality of switch disconnectors to reduce the energy consumption of the auxiliary power network.

Due to the one or the plurality of switch disconnectors, it is possible to disconnect the first auxiliary group from power. This helps to save energy in the case that the first auxiliary group is not needed for the operation of the wind turbine.

Instead of exactly one switch disconnector there may also be provided multiple switch disconnectors associated with different electrical consumers. The first auxiliary group of electrical consumers is not critical for the determination of wind conditions sufficient for a return to operation and/or for command and control capabilities of the wind turbine. The first auxiliary group can comprise a yaw system, a pitch system, environmental management systems or the like. The second auxiliary group of electrical consumers is critical for the determination of wind conditions sufficient for a return to operation and/or for command and control capabilities. Hence, the second auxiliary group cannot be disconnected from the auxiliary power network. The second auxiliary group can comprise wind sensors, a wind turbine controller, communication equipment or the like.

According to an embodiment, the wind turbine further comprises an uninterruptable power supply which is interposed between the auxiliary power network and the second auxiliary group.

The uninterruptable power supply (UPS) can supply power to the second auxiliary group in the case that the auxiliary power network has no power.

The wind turbine further comprises a power conditioning device for providing power to the hydrogen production system as well as to the auxiliary power network.

Power from the generator is conditioned to a suitable voltage and frequency for the wind turbine's internal consumers by means of the power conditioning device.

According to a further embodiment, the wind turbine further comprises a battery energy storage system for storing electrical energy.

The battery energy storage system (BESS) comprises batteries as well as a control mechanism.

According to a further embodiment, the battery energy storage system works as an online uninterruptable power supply.

An additional uninterruptable power supply can thus be omitted.

According to a further embodiment, the wind turbine further comprises a switch device which is suitable to connect the auxiliary power network either to the power conditioning device or to the battery energy storage system.

Depending on a mode of the wind turbine, the switch device is actuated.

According to a further embodiment, the wind turbine further comprises a hydrogen fuel cell for powering the auxiliary power network.

In this case the battery energy storage system is expendable. The fuel hydrogen cell can be connected to a hydrogen collection system or to a local hydrogen reservoir.

According to a further embodiment, the wind turbine further comprises a hydrogen collection system and/or a local hydrogen reservoir which is connected to the hydrogen production system.

The hydrogen collection system is used for transport of the hydrogen to a remote collection and distribution facility. Alternatively, the hydrogen may be stored in the local hydrogen reservoir under pressure and/or at cold temperatures. The hydrogen reservoir may be either very large, such that it may store significant amounts of hydrogen for bulk retrieval or it is sized smaller such that it contains only the necessary energy reserve for maintaining operation of the wind turbine.

According to a further embodiment, the wind turbine works at a non-grid frequency.

The frequency can be 400 Hz, for example. A grid frequency normally has 50 Hz or 60 Hz.

According to a further embodiment, the wind turbine is grid-disconnected.

This means that the wind turbine has no connection to a grid. Alternatively, there can be provided a grid connection.

Further, a method for operating such a wind turbine is provided. The method comprises the following steps: a) performing a hydrogen production start-up mode, and b) producing hydrogen in a hydrogen producing mode of the wind turbine after performing step a).

The hydrogen production start-up mode is necessary to transition the wind turbine from a sleep mode or a local power mode to the hydrogen production mode. The hydrogen production start-up mode comprises pressurizing and heating the hydrogen production system.

According to an embodiment, when the wind turbine leaves the hydrogen producing mode it transitions into a local power mode, wherein the auxiliary power network is powered by a battery energy storage system or a hydrogen fuel cell in the local power mode.

In the local power mode, no hydrogen is produced.

According to a further embodiment, the local power mode is used to transition the wind turbine in and out of operation.

In the local power mode, the power to the auxiliary power network is delivered from the battery energy storage system or the hydrogen fuel cell. In the local power mode, all systems of the wind turbine are powered. While in local power mode, wind tracking is performed to maintain alignment of a rotor of the wind turbine with the wind. System cooling, heating and dehumidification also continue. During automated operation, local power mode is primarily used for transitioning the wind turbine in and out of operation. Before the generator begins producing power, the wind turbine must be aligned with the wind and the pitch system for the rotor blades must be powered up and functional. The energy to perform these activities is delivered by the battery energy storage system using energy previously stored in the batteries thereof. Similar activity is needed when transitioning out of operation to safely decelerate the rotor and put the wind turbine in a safe idling state. Local power mode can also be used during maintenance visits to the wind turbine, where power us used for wind turbine components such as internal lights, crane hoists, service lifts, and power outlets for tooling. In this case, local power mode is forced on such that transitions out of local power mode do not occur unless commanded by the operator or if the available energy in the battery energy storage system is depleted.

According to a further embodiment, when the wind turbine leaves the local power mode it transitions into a sleep mode, wherein in the sleep mode the one or the plurality of switch disconnectors is opened to electrically disconnect the first auxiliary group from the auxiliary power network.

Following a waiting period in local power mode, the consumption of energy from the battery energy storage system is reduced by removing the supply of power to the first auxiliary group and only powering the second auxiliary group. This lower power consuming mode is referred to as sleep mode. The transition from local power mode to sleep mode may be achieved by opening the one or the plurality of switch disconnectors. The remaining electrical consumers of the second auxiliary group continue functioning to enable monitoring of wind conditions and to provide for operator command and control capabilities. In the modes power is supplied by the hydrogen fuel cell or the battery energy storage system.

According to a further embodiment, the wind turbine transitions into a hibernate mode when there is an interruption in power supply.

In the hibernate mode, neither the wind turbine power conditioning device nor the battery energy storage system will provide power. The wind turbine will make a transition using the uninterruptible power supply to a full power-off state. A minimum energy reserve threshold is used for transition to hibernate mode. This will ensure that sufficient energy is available in the battery energy storage system when a wake-up command is received to power-up from hibernate mode. There should be enough energy available to power the auxiliary groups and return the wind turbine to operation. Returning the wind turbine to operation will then allow for the recharging of the batteries of the battery energy storage system.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

DETAILED DESCRIPTION

In the Figures, like reference numerals designate like or functionally equivalent elements, unless otherwise indicated.

Figure 1:
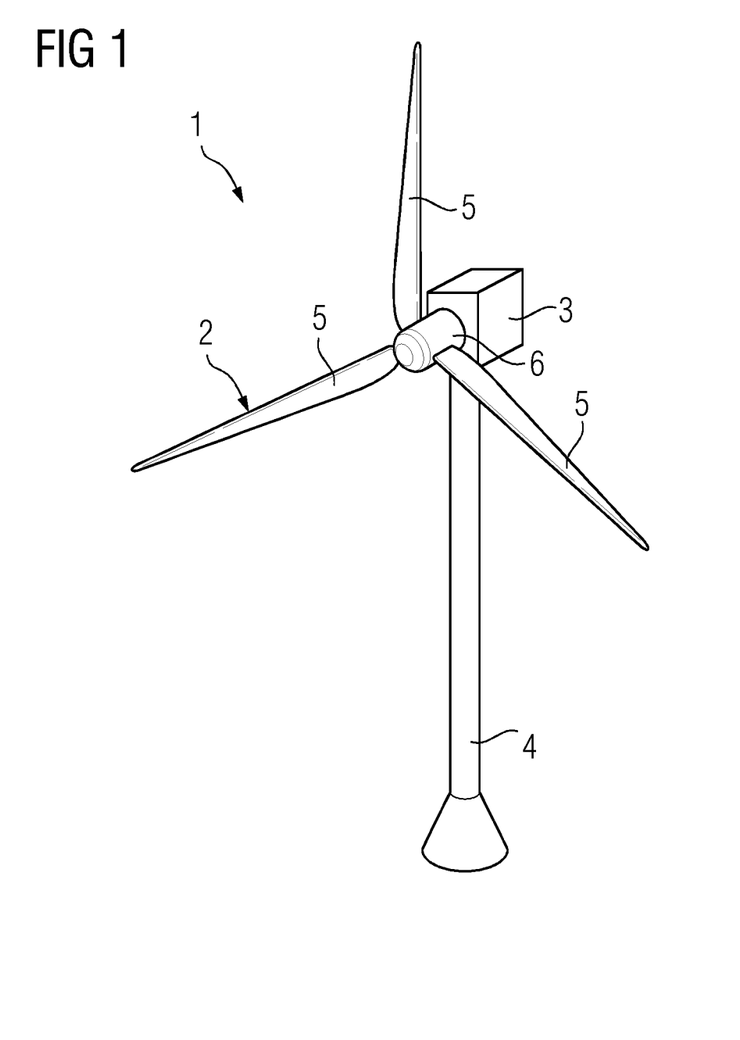
FIG. 1 shows a perspective view of a wind turbine according to one embodiment.

FIG. 1 shows a wind turbine 1 according to one embodiment.

The wind turbine is an offshore wind turbine. The wind turbine 1 comprises a rotor 2 connected to a generator (not shown) arranged inside a nacelle 3. The nacelle 3 is arranged at the upper end of a tower 4 of the wind turbine 1. The tower 4 has a plurality of tower sections that are arranged on top of each other. The tower 4 can be named wind turbine tower.

The rotor 2 comprises three rotor blades 5. The rotor blades 5 are connected to a hub 6 of the wind turbine 1. Rotors 2 of this kind may have diameters ranging from, for example, 30 to 160 meters or even more. The rotor blades 5 are subjected to high wind loads. At the same time, the rotor blades 5 need to be lightweight. For these reasons, rotor blades 5 in modern wind turbines 1 are manufactured from fiber-reinforced composite materials. Therein, glass fibers are generally preferred over carbon fibers for cost reasons. Oftentimes, glass fibers in the form of unidirectional fiber mats are used.

Figure 2:
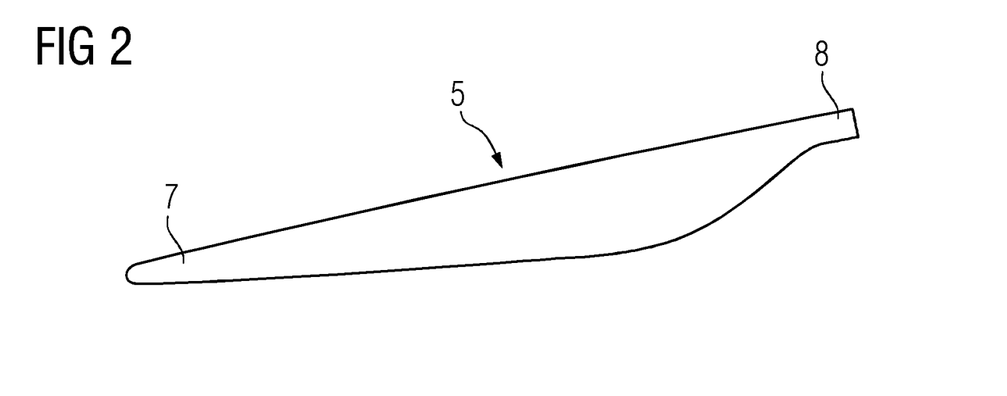
FIG. 2 shows a perspective view of a wind turbine rotor blade according to one embodiment.

FIG. 2 shows a rotor blade 5 according to one embodiment.

The rotor blade 5 comprises an aerodynamically designed portion 7, which is shaped for optimum exploitation of the wind energy and a blade root 8 for connecting the rotor blade 5 to the hub 6.

Figure 3:
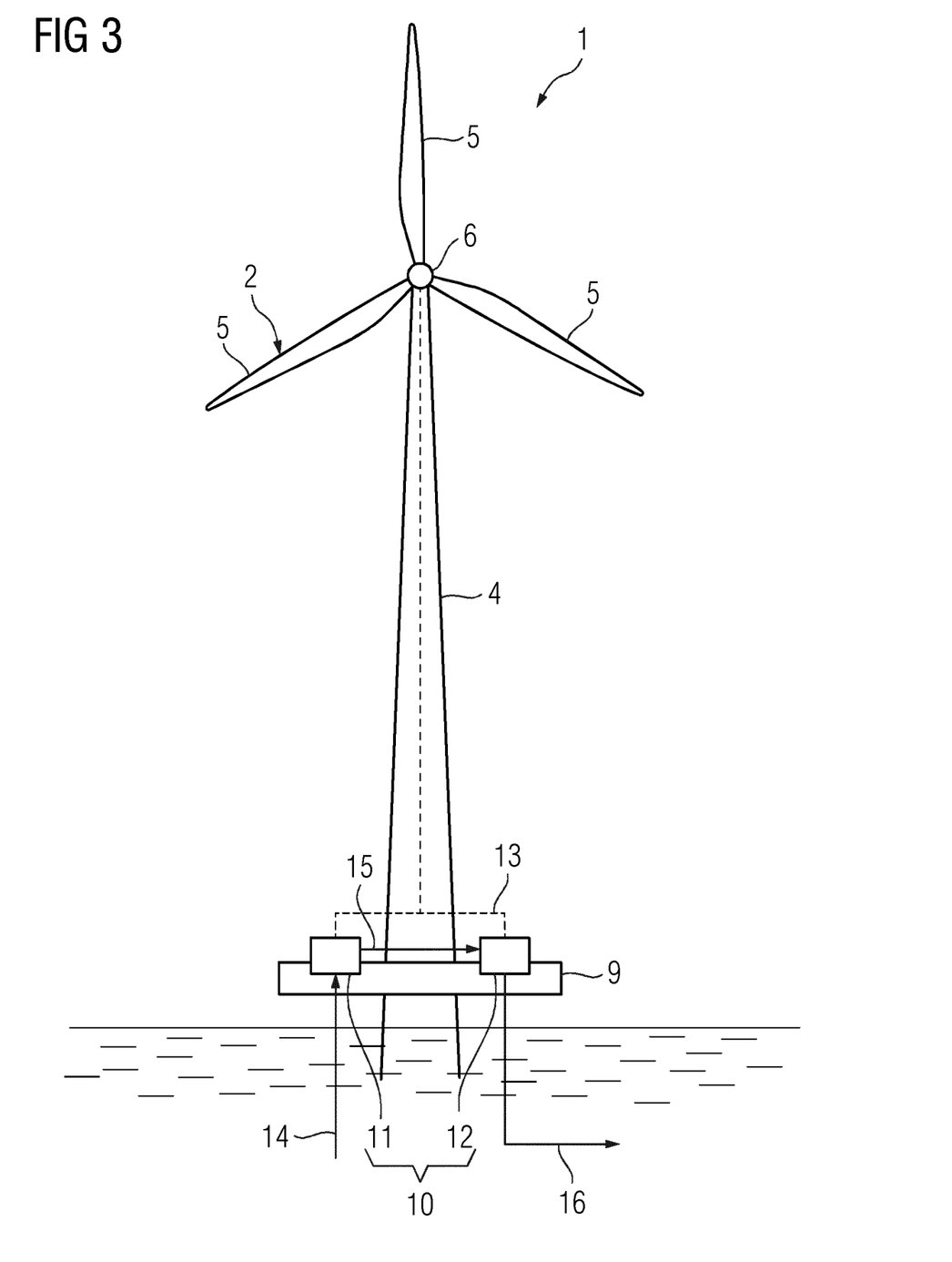
FIG. 3 shows another view of the wind turbine according to FIG. 1.

FIG. 3 shows another view of the wind turbine 1.

The wind turbine 1 has a platform 9 that supports a hydrogen production system 10. The hydrogen production system 10 has a water desalination unit 11 and an electrolyzer 12. A power connection 13 connects a generator (not shown) to the water desalination unit 11 and the electrolyzer 12. The water desalination unit 11 has a sea water intake 14 for taking in seawater. Freshwater is guided from the water desalination unit 11 to the electrolyzer 12 by means of a supply pipe 15.

The water desalination unit 11 is configured for the desalination and supply of water to the electrolyzer 12 to produce hydrogen. The hydrogen produced is transported to shore or to a central platform using a hydrogen collection system, in this example comprised of a hydrogen export pipeline 16.

The wind turbine 1 is usable for both, either onshore or offshore installation. The wind turbine 1 uses power extracted from the moving wind stream to power a hydrogen producing electrolysis process, in the absence of an electrical network connection. The hydrogen produced by the wind turbine 1 is transported away from the wind turbine 1 through a hydrogen collection system or stored locally in a hydrogen reservoir. Alternatively, the hydrogen may be processed locally into ammonia or another chemical with commercial value. This may also then be stored locally at the wind turbine or transported elsewhere through a collection system.

The benefit of the wind turbine 1 is that by forgoing an electrical grid connection, there is substantial cost reduction in both the design of the wind turbine 1 and the balance of plant for a wind farm (an array of similar wind turbines 1). At the wind turbine level, the absence of an electrical network connection removes the need to include electrical hardware within the wind turbine 1 which has the dedicated purpose of conditioning power generated by the wind turbine 1 for interfacing with the electrical network. This allows removal of items such as the medium/high voltage transformers, switchgear and cabling necessary for power distribution to an electrical collection system.

At the wind farm level, the electrical collection system including array cabling and substations are not necessary.

A collection system of pipes may be used to transport the hydrogen or other chemicals produced (e.g., ammonia) under pressure from the wind turbine 1 to a remote collection and distribution facility. Alternatively, the chemical may be collected from the wind turbine by a vehicle or vessel for transport.

Figure 4:
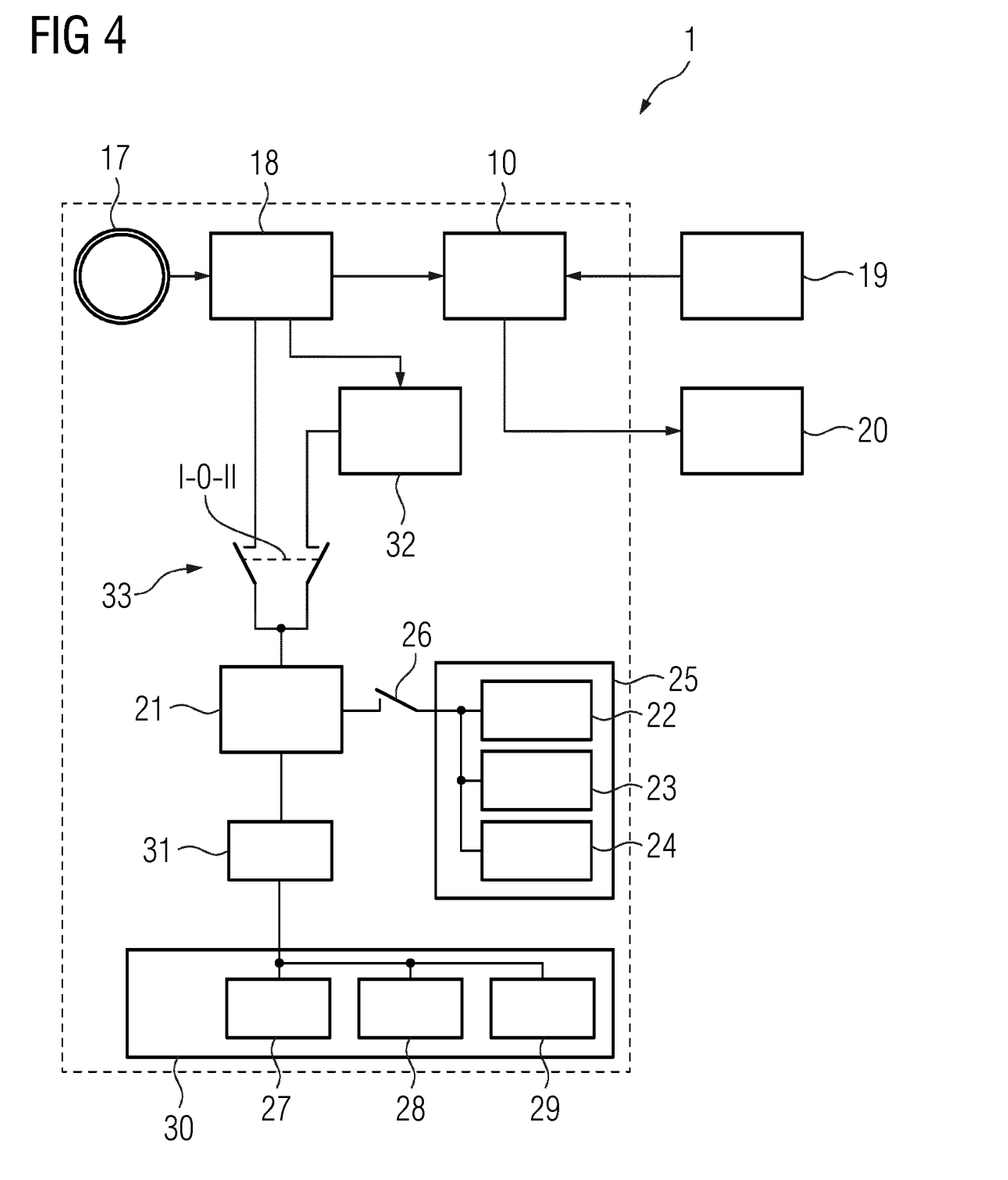
FIG. 4 shows a schematic view of a wind turbine according to another embodiment.

FIG. 4 shows a schematic view of another embodiment of a wind turbine 1.

The wind turbine 1 is a grid-disconnected hydrogen-producing wind turbine. The wind turbine 1 comprises a generator 17. Power is extracted from the wind by way of the aerodynamic rotor 2 which turns the generator 17. Power from the generator 17 is conditioned to a suitable voltage and frequency for the wind turbine's 1 internal consumers by means of a power conditioning device 18.

Unlike for a grid connected wind turbine, where the operating frequency of the wind turbine's internal systems are determined by the external grid frequency (50 Hz or 60 Hz), the grid-disconnected wind turbine 1 can be designed to operate at any frequency. The wind turbine 1 may operate, for example, at 400 Hz commonly used in aviation and maritime industries. This allows for smaller and lighter motors and power transformers than what is available at 50 or 60 Hz and would result in a smaller ripple when power is rectified to direct current.

During operation of the wind turbine 1, the bulk of the power is delivered to a hydrogen production system 10. This hydrogen production system 10 operates based on electrolysis using an external water source 19 such as the surrounding water of an offshore wind turbine 1 or nearby or underground water for an onshore wind turbine 1. The hydrogen produced by the wind turbine 1 may be directly fed into a hydrogen collection system 20 for transport to a remote collection and distribution facility.

Alternatively, hydrogen produced by the hydrogen production system 10 may be stored in a local hydrogen reservoir under pressure and/or at cold temperatures. The hydrogen reservoir may be either very large, such that it may store significant amounts of hydrogen for bulk retrieval or it is sized smaller such that it contains only the necessary energy reserve for maintaining operation of the wind turbine 1. This hydrogen reservoir may feed a hydrogen collection system or a further chemical synthesis process within the wind turbine 1.

A portion of the power generated by the wind turbine 1 is also delivered to a wind turbine's 1 auxiliary power network 21. The auxiliary power network 21 is an internal network which distributes power to electrical consumers within the wind turbine 1 that are necessary for the operation of the wind turbine 1. These consumers may include a yaw system 22, a pitch system 23 and environmental management systems 24 (cooling, heating, dehumidification). The systems 22 to 24 are grouped in a first auxiliary group 25. The first auxiliary group 25 can be disconnected from the auxiliary power network 21 by means of a switch disconnector 26. There can be provided one switch disconnector 26. However, there can also be provided multiple or a plurality of switch disconnectors 26. For illustrative purposes only, the switch disconnector 26 is represented as a single device in the following. The systems 22 to 24 can be named electrical consumers.

Wind sensors 27, a wind turbine controller 28 and communication equipment 29 are grouped in a second auxiliary group 30. The wind sensors 27, the wind turbine controller 28 and the communication equipment 29 can also be named electrical consumers. There is provided an uninterruptable power supply 31 (UPS) for supplying power to the second auxiliary group 30. The first auxiliary group 25 is not critical for determination of wind conditions sufficient for a return to operation and/or for command and control capabilities. In contrast to that, the second auxiliary group 30 is critical for determination of wind conditions sufficient for a return to operation and/or for command and control capabilities.

The wind turbine 1 is capable of operating when wind speeds are within the operational wind speed range and without fault. The wind speed range is defined by a lower cut-in wind speed, $V_{in}$, and an upper cut-out wind speed $V_{out}$. Faults that may prevent operation include any errors or malfunctions of the wind turbine's 1 auxiliary equipment, control system, or power production and conditioning systems.

During these periods where the wind turbine 1 is not capable of operating, power to the auxiliary power network 21 is provided by a battery energy storage system 32 (BESS). The power from the battery energy storage system 32 is delivered to the auxiliary power network 21 to ensure the auxiliary groups 25, 30 of the wind turbine 1 remain functional. The source of power for the auxiliary power network 21 is controlled by a switch device 33.

The state-of-charge of the battery energy storage system 32 is maintained during operation, where a portion of the power produced is delivered to the battery energy storage system 32 to either recharge the batteries or to maintain an optimal state-of-charge over long durations. As an alternative to batteries, other energy storage media may be used where the technology provides a cost benefit superior to the battery energy storage system 32.

Figure 5:
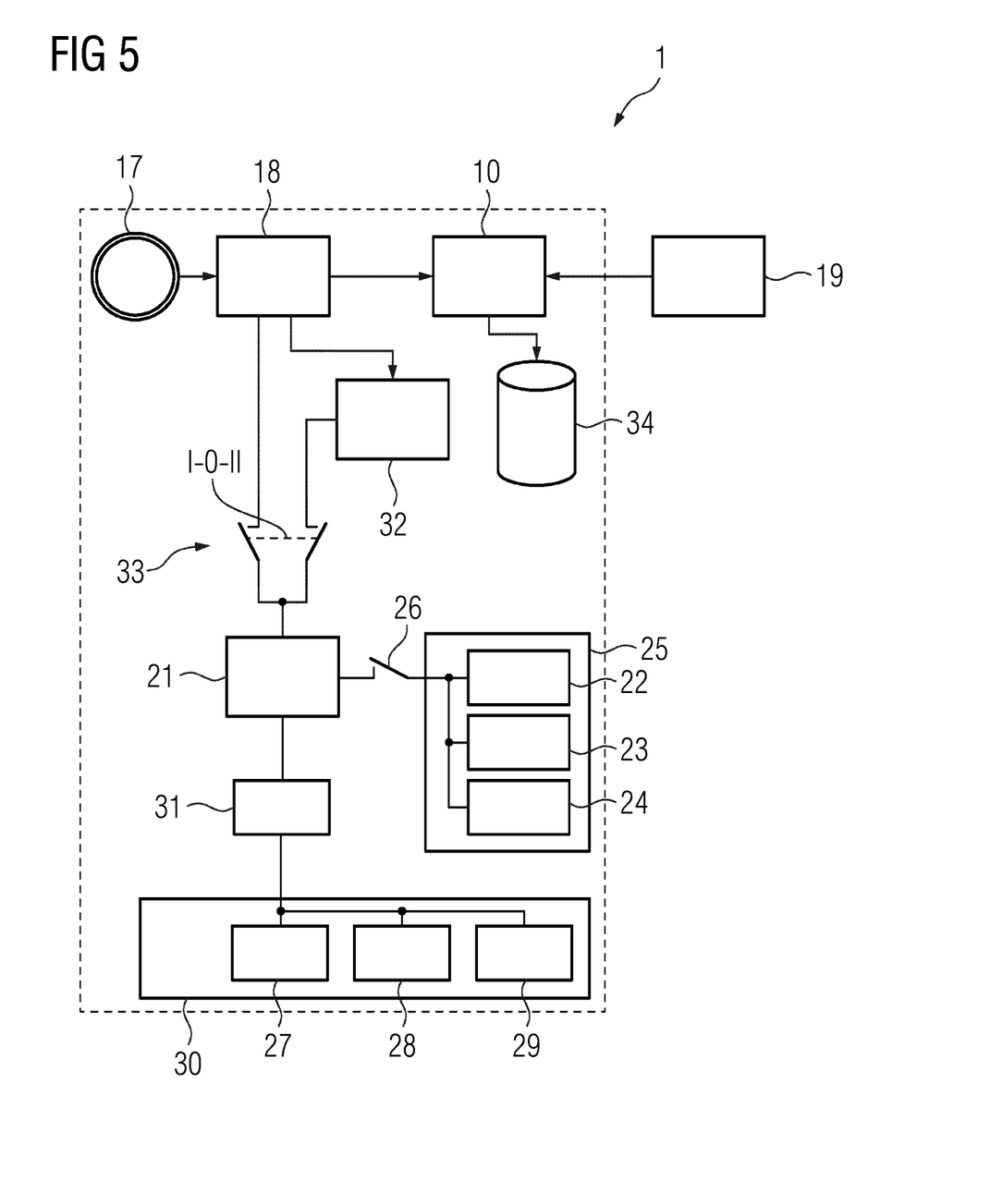
FIG. 5 shows a schematic view of a wind turbine according to another embodiment.

FIG. 5 shows a schematic view of another embodiment of a wind turbine 1.

The wind turbine 1 according to FIG. 5 differs from the wind turbine 1 according to FIG. 4 only in that hydrogen produced by the hydrogen production system 10 is stored in a local hydrogen reservoir 34 under pressure and/or at cold temperatures. The hydrogen reservoir 34 may be either very large, such that it may store significant amounts of hydrogen for bulk retrieval or it is sized smaller such that it contains only the necessary energy reserve for maintaining operation of the wind turbine 1. This hydrogen reservoir 34 may feed a hydrogen collection system or a further chemical synthesis process within the wind turbine 1.

Figure 6:
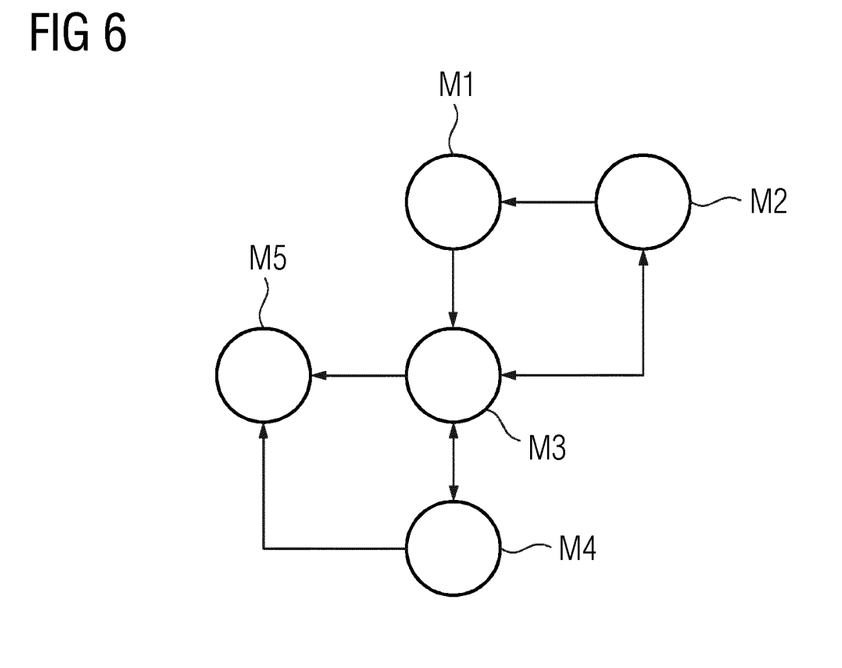
FIG. 6 shows a schematic diagram of a method for operating a wind turbine according to one embodiment.

FIG. 6 shows a method of operation of the wind turbines 1 as explained before.

For a healthy wind turbine 1, it is primarily the wind conditions that determine the availability to produce power, and thereby to generate hydrogen through electrolysis. In conditions where the wind speed, V, is within the operating range such that $V_{in}<V<V_{out}$ then the wind turbine 1 can operate in a hydrogen producing mode M1. In this hydrogen producing mode M1, the wind turbine 1 is considered to be in normal operation and producing hydrogen.

When transitioning into hydrogen producing mode M1, the wind turbine 1 must first initiate the hydrogen production system 10. This transition mode is called hydrogen production start-up mode M2. This hydrogen production start-up mode M2 involves pressurizing and heating the hydrogen production system 10. The power used during this hydrogen production start-up mode M2 is provided by the wind turbine 1 once it is in operation in order to avoid excessive power consumption from the battery energy storage system 32. If the wind conditions are no longer in the operational range or a wind turbine fault occurs while in hydrogen production start-up mode M2, then initialization will be discontinued until the wind turbine 1 is again able to operate. In the modes M1, M2 the power is supplied by the generator 17.

Once the transition to hydrogen producing mode M1 is complete, the wind turbine 1 will remain in this hydrogen producing mode M1 until any of the following occur: Regularly occurring self-preservation activity is required (e.g. untwisting of tower cables, automated diagnostics of safety systems, etc.), wind conditions are outside the operating range, a fault occurs on the wind turbine 1 prohibiting operation, or an operator command is received to stop operation.

For a wind turbine 1 without connection to a hydrogen collection system 20, the production of hydrogen may discontinue once the local hydrogen reservoir 34, or another synthesized chemical, is full. However, the wind turbine 1 may remain in operation as this can have load reducing benefits (typically offshore). Alternatively, the wind turbine 1 may discontinue operation when the local hydrogen reservoir 34 is full in cases where continued operation may not be beneficial (typically onshore).

When the wind turbine 1 leaves the hydrogen producing mode M1, it transitions to a local power mode M3. In this local power mode M3, the power to the auxiliary power network 21 is delivered from the battery energy storage system 32. In local power mode M3 all systems of the wind turbine 1 are powered. While in local power mode M3 wind tracking is performed to maintain alignment of the rotor 2 of the wind turbine 1 with the wind. System cooling, heating and dehumidification also continue.

During automated operation, local power mode M3 is primarily used for transitioning the wind turbine 1 in and out of operation. Before the generator 17 begins producing power, the wind turbine 1 must be aligned with the wind and the pitch system 23 for the rotor blades 5 must be powered up and functional. The energy to perform these activities is delivered by the battery energy storage system 32 using energy previously stored in the batteries thereof. Similar activity is needed when transitioning out of operation to safely decelerate the rotor 2 and put the wind turbine 1 in a safe idling state.

Local power mode M3 is also used during maintenance visits to the wind turbine 1, where power us used for wind turbine components such as internal lights, crane hoists, service lifts, and power outlets for tooling. In this case, local power mode M3 is forced on such that transitions out of local power mode M3 do not occur unless commanded by the operator or if the available energy in the battery energy storage system 32 is depleted.

Minimizing the consumption of energy from the battery energy storage system 32 while the wind turbine 1 is not operating is accomplished by reducing the overall power consumption, when appropriate. For this reason, the auxiliary power network may designate two groups of consumers, namely the first auxiliary group 25 and the second auxiliary group 30. The first auxiliary group 25 comprises consumers that not critical for determination of wind conditions sufficient for a return to operation and/or for command and control capabilities. The second auxiliary group 30 comprises consumers that are critical for determination of wind conditions sufficient for a return to operation and/or for command and control capabilities.

Following a waiting period in local power mode M3, the consumption of energy from the battery energy storage system 32 is reduced by removing the supply of power to the first auxiliary group 25 and only powering the second auxiliary group 30. This lower power consuming mode is referred to as sleep mode M4. The transition from local power mode M3 to sleep mode M4 may be achieved by opening the switch disconnector 26. The remaining consumers of the second auxiliary group 30 continue functioning to enable monitoring of wind conditions and to provide for operator command and control capabilities. In the modes M3, M4 power is supplied by a hydrogen fuel cell or the battery energy storage system 32.

In case there is an interruption in the supply of power by either the wind turbine's 1 power conditioning device 18 or the battery energy storage system 32, the uninterruptible power supply 31 is placed inline on the power supply path to the consumers of the second auxiliary group 30. This ensures that short duration power interruptions, such as during a transition between power sources or faults in either of the power supply systems, do not lead to an immediate loss of wind turbine control.

There is a finite amount of energy available in the battery energy storage system 32 for use while in either sleep mode M4 or local power mode M3, so a depletion of this energy store may occur. In the event that the battery energy storage system 32 becomes nearly depleted; a transition will take place to a power down state referred to as hibernate mode M5. In hibernate mode M5, neither the wind turbine power conditioning device 18 nor the battery energy storage system 32 will provide power. The wind turbine 1 will make a transition using the uninterruptible power supply 31 to a full power-off state.

A minimum energy reserve threshold is used for transition to hibernate mode M5. This will ensure that sufficient energy is available in the battery energy storage system 32 when a wake-up command is received to power-up from hibernate mode M5. There should be enough energy available to power the auxiliary groups 25, 30 and return the wind turbine 1 to operation. Returning the wind turbine 1 to operation will then allow for the recharging of the batteries of the battery energy storage system 32.

Command and control of the wind turbine 1 is possible through a remote communication interface as well as a local control interface. The remote communication interface can either be through a physical network, such as a fiber optic communication network, or through a wireless network using terrestrial or satellite-based communication hardware. The absence of an electrical grid, and therefore electrical array cabling, may support the use of a wireless supervisory control and data acquisition (SCADA) solution.

Through either local or remote user commands, an operator is able to stop, start and position the wind turbine 1. Additionally, the operator may force the wind turbine 1 to transition to and remain in either the local power mode M3, sleep mode M4 or hibernate mode M5. Forcing the wind turbine 1 into sleep mode M4 or hibernate mode M5, for example, may be done in order to conserve on stored energy consumption during periods where operators know that the wind turbine 1 will not be soon returning to operation.

At wind speeds higher than the cut-out wind speed, $V_{out}$, the wind turbine 1 may remain in local power mode M3 rather than transition to sleep mode M4 in order to support wind tracking in high wind. This may be done in cases where there is a load reduction benefit to maintaining a preferred orientation of the wind turbine 1 toward the wind and would be an automated mode of operation. A modified version of this operational strategy would be to use sleep mode M4 only when the wind turbine 1 is properly oriented and to transition to local power mode M3 only when orientation adjustments are required. This would optimize the consumption of stored energy during these high wind events.

There is a risk that when the wind speed transitions from being outside the operational range to within the operational range that it may only do so for a short period of time. The wind speed must remain in the operational range for a sufficient amount of time so that the wind turbine 1 can be put into operation and the hydrogen production system 10 can initialize. To avoid wasted energy due to intermittent wind conditions, the condition for transition into operation is more sophisticated than a simple wind speed threshold.

A number of methods may be used for ensuring that wind speeds are sufficient for operation. A time-domain filtering of wind speed signal or time delay of transition to operation, transition conditions based upon more than just wind speed, but also the rate and direction of change of the wind speed, model-based forecasting of future wind conditions based on local observations of wind speed, wind direction, temperature and/or atmospheric pressure at the wind turbine 1, and/or forecasting of future wind conditions based on meteorological data collected beyond the wind turbine 1, with the result sent to the wind turbine 1 via a communication system.

Figure 7:
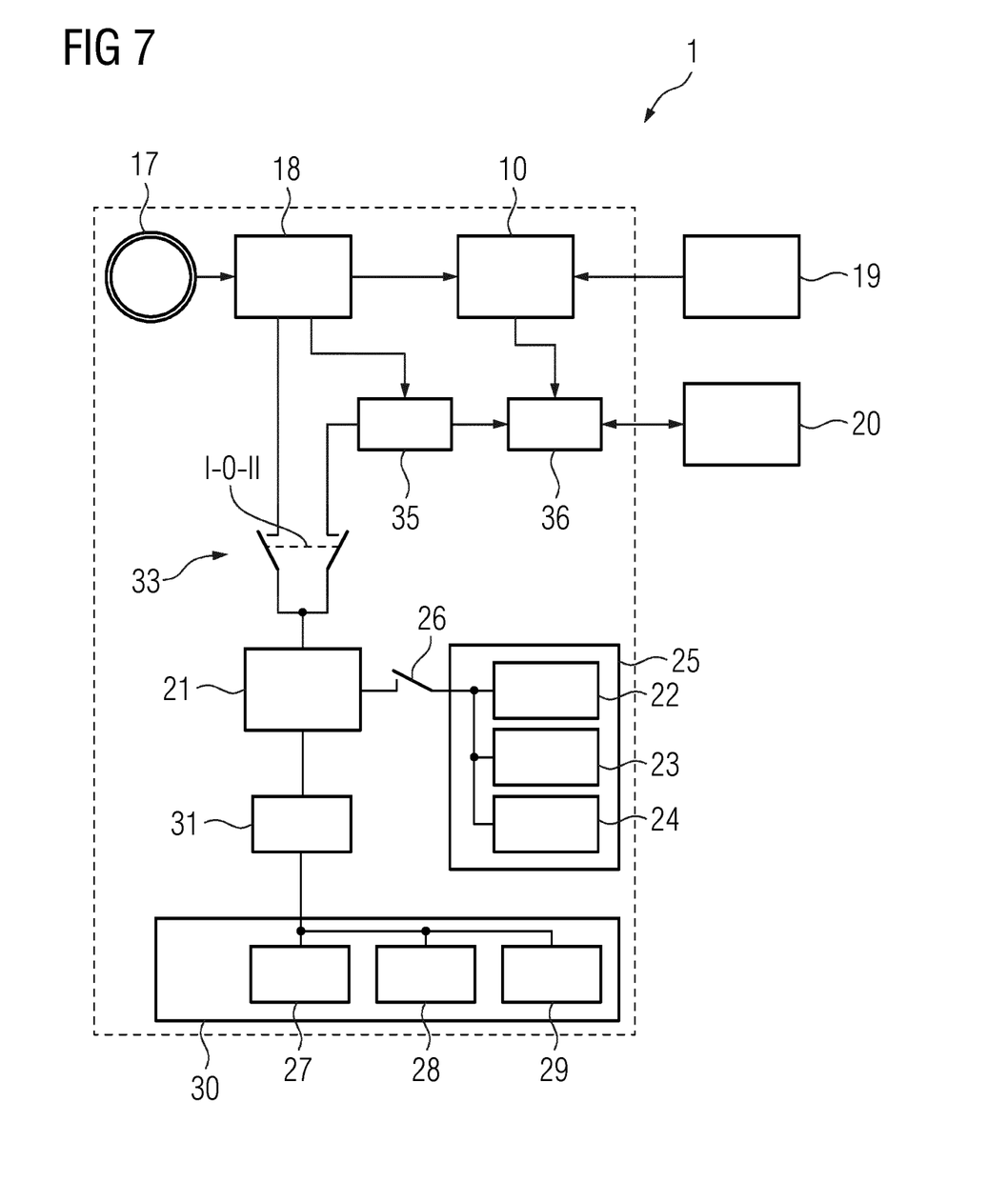
FIG. 7 shows a schematic view of a wind turbine according to another embodiment.

FIG. 7 shows a schematic view of another embodiment of a wind turbine 1.

The wind turbine 1 according to FIG. 7 is identical to the wind turbine 1 according to FIG. 4, except that the battery energy storage system 32 is removed, and a hydrogen fuel cell 35 is introduced. The hydrogen used by the hydrogen fuel cell 35 may be delivered directly from the hydrogen collection system 20, by allowing for the return flow of hydrogen into the wind turbine 1, or from a local hydrogen reservoir 34 (see FIG. 5). A hydrogen distribution device 36 is provided between the hydrogen collection system 20 and the hydrogen fuel cell 35. The hydrogen distribution device 36 is also connected to the hydrogen production system 10.

During periods where operation is not possible, rather than use a battery energy storage system 32 to maintain power to the auxiliary power network 21, the hydrogen fuel cell 35 is used instead. To reduce hydrogen consumption by the hydrogen fuel cell 35 in the sleep mode M4 is used when the wind turbine 1 is out of operation. The hibernate mode M5 may also be used, but with a threshold for transition being determined by the remaining hydrogen available in the local hydrogen reservoir 34 (see FIG. 5) or the pressure available in the hydrogen collection system 20.

Local power mode M3 is also the same as described but performed using power supplied by the hydrogen fuel cell 35. Operator command and control capabilities are the same as described. The advantage of such a system is that the ability to maintain power to the wind turbine 1 for long durations of time out of operation are improved. Hydrogen may be fed from the hydrogen collection system 20 to power the hydrogen fuel cell 35 for extended periods of time, whereas with a battery energy storage system 32 there may be less energy available for use.

The efficiency of converting hydrogen into electricity through the hydrogen fuel cell 35 is likely to be lower than the efficiency of the battery energy storage system 32. During operation, slightly more hydrogen will be produced since no power will be diverted to maintain the charge of the battery energy storage system 32. However, since hydrogen is being consumed during periods where the wind turbine 1 is out of operation for powering the hydrogen fuel cell 35, the net hydrogen transported away from the wind turbine 1 over time may be less.

Figure 8:
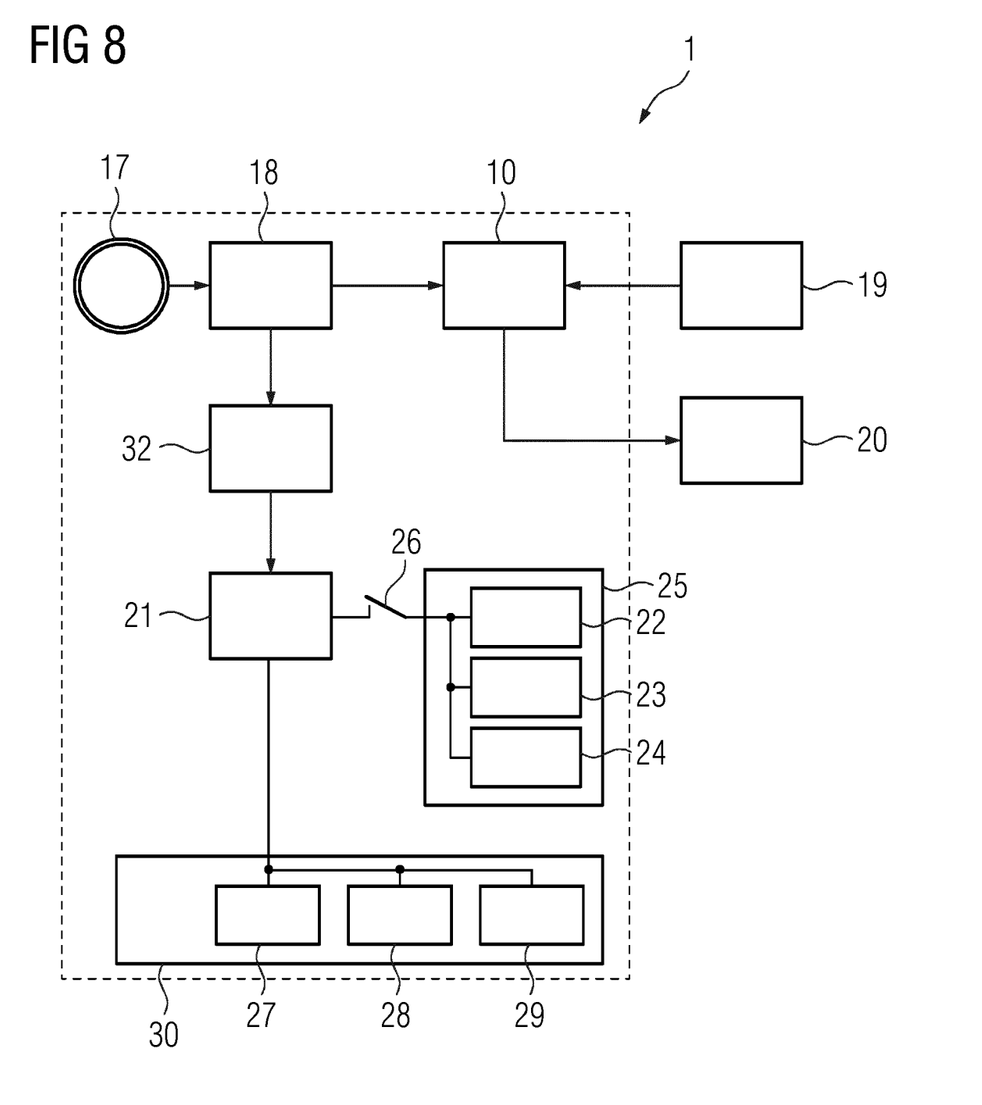
FIG. 8 shows a schematic view of a wind turbine according to another embodiment.

FIG. 8 shows a schematic view of another embodiment of a wind turbine 1.

The wind turbine 1 according to FIG. 8 is almost identical to the wind turbine 1 according to FIG. 4, except that there is no uninterruptable power supply 31. Rather, a battery energy storage system 32 is used it as an online uninterruptable power supply (online UPS). In this configuration, all of the energy produced by the wind turbine 1 during operation for the auxiliary power network 21 goes through the battery energy storage system 32.

In the event that the operation of the wind turbine 1 discontinues, power continues to be supplied uninterrupted from the battery energy storage system 32. In this configuration there is no need for a secondary control uninterruptable power supply 31 as the battery energy storage system 32 acts as the uninterruptable power supply for the entire system. A switch device 33 is also not needed to transition the auxiliary power network supply 21 from the power conditioning device 18 to the battery energy storage system 32.

In this system design all power is passed through the battery of the battery energy storage system 32. Hence, there may be a higher usage rate of the system batteries, leading to a lower overall battery lifetime. The battery energy storage system 32 would also have to be rated for the full power level used by the auxiliary groups 25, 30 during operation of the wind turbine 1, rather than the power level while out of operation only.

Figure 9:
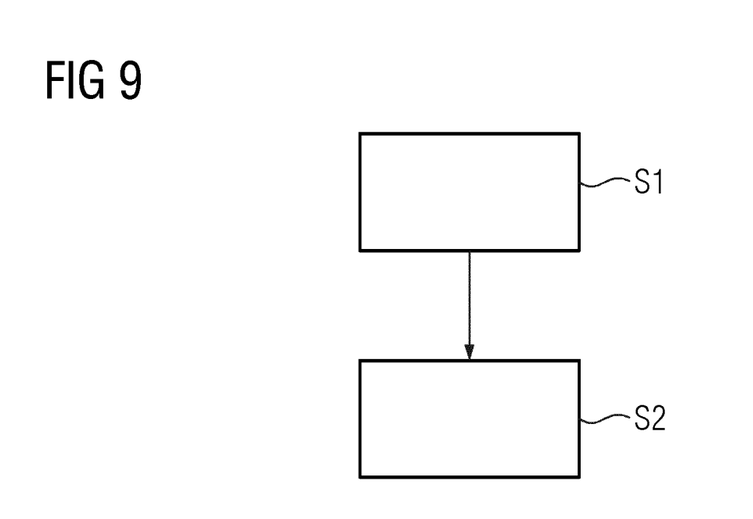
FIG. 9 shows a schematic block diagram of a method for operating a wind turbine according to one embodiment.

A grid disconnected hydrogen producing wind turbine 1 as explained before may be well-suited for offshore installation for the following reasons. There is an abundant supply of water for using in hydrogen electrolysis. High electrical grid connection costs (especially when there is a large distance to shore) are omitted. There are high-capacity factors (generally higher and more steady wind conditions). FIG. 9 shows a schematic block diagram of a method for operating the wind turbine 1.

In a step S1, the hydrogen production start-up mode M2 is performed. In a step S2, hydrogen is produced in the hydrogen producing mode M1 of the wind turbine 1 after performing step S1.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine, comprising:
a generator for converting wind energy into electrical energy;
a hydrogen production system for producing hydrogen by means of the electrical energy;
a first auxiliary group of electrical consumers;
a second auxiliary group of electrical consumers;
an auxiliary power network for powering the first auxiliary group and the second auxiliary group; and
a power conditioning device for providing power to the hydrogen production system as well as to the auxiliary power network, wherein only the first auxiliary group can be electrically disconnected from the auxiliary power network by means of one or a plurality of switch disconnectors to reduce an energy consumption of the auxiliary power network.

2. The wind turbine according to claim 1, further comprising an uninterruptable power supply which is interposed between the auxiliary power network and the second auxiliary group.

3. The wind turbine according to claim 1, further comprising a battery energy storage system for storing electrical energy.

4. The wind turbine according to claim 3, wherein the battery energy storage system works as an online uninterruptable power supply.

5. The wind turbine according to claim 3, further comprising a switch device which is suitable to connect the auxiliary power network either to the power conditioning device or to the battery energy storage system.

6. The wind turbine according to claim 1, further comprising a hydrogen fuel cell for powering the auxiliary power network.

7. The wind turbine according to claim 1, further comprising a hydrogen collection system and/or a local hydrogen reservoir which is connected to the hydrogen production system.

8. The wind turbine according to claim 1, wherein the wind turbine works at a non-grid frequency.

9. The wind turbine according to claim 1, wherein the wind turbine is grid-disconnected.

10. A method for operating the wind turbine according to claim 1, the method comprising the following steps:
a) performing a hydrogen production start-up mode, and
b) producing hydrogen in a hydrogen producing mode of the wind turbine after performing step a.

11. The method according to claim 10, wherein, when the wind turbine leaves the hydrogen producing mode, the wind turbine transitions into a local power mode, wherein the auxiliary power network is powered by a battery energy storage system or a hydrogen fuel cell in the local power mode.

12. The method according to claim 11, wherein the local power mode is used to transition the wind turbine in and out of operation.

13. The method according to claim 11, wherein, when the wind turbine leaves the local power mode, the wind turbine transitions into a sleep mode, wherein in the sleep mode the one or the plurality of switch disconnectors is opened to electrically disconnect the first auxiliary group from the auxiliary power network.

14. The method according to claim 10, wherein the wind turbine transitions into a hibernate mode when there is an interruption in power supply.

* * * * *